US006566316B2

(12) United States Patent
Hiatt et al.

(10) Patent No.: US 6,566,316 B2
(45) Date of Patent: May 20, 2003

(54) COATING REMOVER CONTAINING TERPENES AND ALCOHOL

(75) Inventors: William Nicholas Hiatt, Signal Hill, CA (US); Shannon Dale Eckel, 2201 E. Willow, Suite #181, Signal Hill, CA (US) 90806

(73) Assignee: Shannon Dale Eckel, Signal Hill, CA (US)

( * ) Notice: Subject to any disclaimer, the term of this patent is extended or adjusted under 35 U.S.C. 154(b) by 0 days.

(21) Appl. No.: 09/850,801

(22) Filed: May 8, 2001

(65) Prior Publication Data

US 2003/0032570 A1 Feb. 13, 2003

(51) Int. Cl.$^7$ .................................. C11D 7/50
(52) U.S. Cl. .................. 510/201; 510/238; 510/365; 510/417; 510/506; 134/3; 134/40
(58) Field of Search ................. 510/365, 417, 510/506, 238, 201; 134/3, 40

(56) References Cited

U.S. PATENT DOCUMENTS

| | | | |
|---|---|---|---|
| 2,194,907 A | | 3/1940 | McPherson |
| 3,642,537 A | | 2/1972 | Garms |
| 3,923,701 A | | 12/1975 | Rutherford |
| 4,120,810 A | | 10/1978 | Palmer |
| 4,212,758 A | | 7/1980 | Shashkina et al. |
| 4,414,128 A | * | 11/1983 | Goffinet |
| 4,599,190 A | | 7/1986 | Maloney |
| 4,612,141 A | * | 9/1986 | Faurote, Jr. et al. |
| 4,664,721 A | | 5/1987 | Valasek |
| 4,836,950 A | | 6/1989 | Madsen et al. |
| 4,859,359 A | * | 8/1989 | DeMatteo et al. |
| 5,013,485 A | | 5/1991 | Tsukuda et al. |
| 5,156,760 A | | 10/1992 | Marchese et al. |
| 5,281,358 A | | 1/1994 | Urushibata et al. |
| 5,340,495 A | | 8/1994 | Mulcahy et al. |
| 5,424,001 A | | 6/1995 | Bayless |
| 5,425,893 A | * | 6/1995 | Stevens |
| 5,449,474 A | | 9/1995 | Lucas et al. |
| 5,464,555 A | | 11/1995 | Bayless |
| 5,534,200 A | * | 7/1996 | Erilli et al. |
| 5,691,289 A | | 11/1997 | Purcell et al. |
| 5,712,234 A | | 1/1998 | Pourreau |
| 5,801,135 A | | 9/1998 | Miyauchi et al. |
| 5,814,163 A | | 9/1998 | Wojcik |
| 6,103,687 A | | 8/2000 | Cody et al. |
| 6,153,571 A | | 11/2000 | Komocki et al. |

OTHER PUBLICATIONS

Burkhard Kirste, Institute of Chemistry, *Terpenes*, Feb. 3, 1998, http://www..chemie.fu–berlin.de/chemistry/oc/terpene/terpene_en.html.

Encyclopedia Britannica, *limonene*, http://www.britannica.com/seo/I/limonene/.

Envirofacts Warehouse Chemical References, *D–Limonene Cas #5989–27–5*, Jul. 23, 1998, http://www.epa.gov/enviro/html/emci/chemref/5989275.html.

Florida Chemical Company, Inc., *What is d–Limonene?*, http://www.floridachemical.com/whatisd–limonene.htm 5–01.

The Good Scents Company, *Limonene, Dextro–*, Dec. 1, 2000, http://www.execpr.com/~goodscnt/data/rw1013772.html.

Abundant Earth, *Herbal Sachets & Pure Cedar Oil*, Dec. 12, 1999, http://www.abundantearth.com/store/aesatchet.html.

Encyclopedia Britannica, *limonene*, Dec. 26, 2000, wysiwyg://53/http://www.britannica . . . 9463+1+48320,00lhtml?query+limonene.

* cited by examiner

*Primary Examiner*—Gregory E. Webb
(74) *Attorney, Agent, or Firm*—Sheldon & Mak; Jeffrey G. Sheldon

(57) ABSTRACT

A composition for removing ink, paint, and other coatings that is substantially non-toxic, non-caustic, non-volatile, biodegradable, meets regulation standards, and has a low disposal cost. The composition comprises an alcohol in an amount from about 5% to about 60% by volume; a terpene containing liquid in an amount from about 5% to about 60% by volume; a sufficient amount of mixing agent for mixing the terpene containing liquid in water; and water.

22 Claims, No Drawings

US 6,566,316 B2

COATING REMOVER CONTAINING TERPENES AND ALCOHOL

BACKGROUND

This invention relates generally to cleaning compositions, and more specifically ink and paint remover solvents, in particular those that are non-toxic and biodegradable.

Compositions that are used to dissolve chemicals, compounds, and other substances incorporate a solvent that functions by forming a mixture of the solvent and the other substance. The particular solvents in a composition are generally characterized as being polar and having a high dielectric constant or non-polar and having a low dielectric constant, or somewhere in between these extremes. These compositions may contain both polar and non-polar compounds, and individual solvent molecules may have both polar and non-polar moieties. The general rule is that "like dissolves like." Substances that are polar tend to be effectively solubilized by compositions that have polar solvent compounds. Conversely, materials that are non-polar in nature are more effectively solubilized by non-polar compositions. For example, water is a highly polar molecule and it is effective at dissolving and solubilizing other polar molecules. However, water is in itself is not effective at dissolving non-polar molecules.

The most common type of compositions for removing paint, ink, and other unwanted non-polar coatings typically incorporate an organic solvent. These cleaning compounds have been in existence for a long time, and many have been shown to be effective. Unfortunately, existing compounds have the undesirable attributes of being caustic, flammable, and toxic.

For example, a common paint stripper methylene chloride is toxic and has a high vapor pressure. This makes the solvent volatile and thus vapor inhalation of these solvents presents a serious health risk. Prolonged exposure to methylene chloride depresses the nervous system (G. G. Fodor and H. Winneke, Proceedings International Clean Air Congress, $2^{nd}$, 238–43, 1970). Repeated exposure to methylene chloride has been linked to digestive disorders and liver damage (C. C. Haun, et al., U.S. National Technical Information Service, AD Report, 1971 # 751432).

A further problem is that the cost associated with manufacture, use, and disposal of existing paint and coating remover compounds is high because the chemicals are toxic and non-biodegradable.

Additionally, a factor that places doubt in the future use of existing compounds for removing paint and coatings is that there is an increasing level of government regulation as a result of the health, safety, and environmental hazzards associated with these chemicals.

Accordingly, there is a need for compounds that are effective at removing paint, ink, carbon and other coatings wherein the removing compound is non-toxic, non-caustic, non-volatile, biodegradable, meets current and future regulation standards (including the California AQMD 2005 standard), and has a low disposal cost.

SUMMARY

The invention satisfies this need. The invention is a composition for that is effective in removing ink, paint, carbon and other such coatings. The composition is substantially non-toxic, non-caustic, non-volatile, biodegradable, meets current and future regulation standards, and has a low disposal cost. The invention also includes methods of using the composition for removing a wide variety of coatings, including paint and ink.

The composition is prepared by combining the following: an alcohol in an amount from about 5% to about 60% by volume; a terpene containing liquid in an amount from about 5% to about 60% by volume; a sufficient amount of mixing agent for mixing the terpene containing liquid in water; and water.

In a preferred embodiment the composition is prepared by combining the following: ethanol in an amount from about 5% to about 60% by volume; limonene in an amount from about 5% to about 45% by volume; a sufficient amount of mixing agent for mixing the limonene in water; an abrasive agent; water; and optionally, an acid, base, or combinations thereof for adjusting the pH of the composition to a suitable range for mixing the composition and thereafter to adjust the pH to a suitable working range.

DESCRIPTION

The following discussion describes in detail several embodiments of the invention. This discussion should not be construed, however, as limiting the invention to those particular embodiments. Practitioners skilled in the art will recognize numerous other embodiments as well. In all of the embodiments described herein that are referred to as being preferred or particularly preferred, these embodiments are not essential even though they may be preferred.

The invention is a composition suitable for use as an ink, paint, and coating remover, and methods of using the composition to remove ink, paint, carbon deposits, and coatings. The term coating used herein includes compositions related to paint such as enamel, lacquer, polyurethane coatings, sealers, varnish, and similar such decorative or protective coatings, and further includes wet and dry inks, chemical deposits, carbon deposits such as soft and hard burnt carbon, dirt, stains, and similar such compounds that are removed from surfaces by cleaning. The paint and coatings are typically removed from hard surfaces such as glass, plastic, and metal. Specific examples include the removal of ink found on printing presses, rollers, and silk screens, and the removal of carbon black deposits on plastic or metal.

The composition is prepared by combining the following: 1) an alcohol in an amount from about 5% to about 60% by volume; 2) a terpene containing liquid in an amount from about 5% to about 60% by volume; 3) a sufficient amount of mixing agent for mixing the terpene containing liquid in water; and optionally 4) water. Accordingly, the composition of the invention comprises the following: 1) an alcohol in an amount from about 5% to about 60% by volume; 2) a terpene containing liquid in an amount from about 5% to about 60% by volume; 3) a sufficient amount of mixing agent for mixing the terpene containing liquid in water; and a desired amount of 4) water. The water is not required, but is typically present in the composition. With respect to the total volume, an embodiment comprising 60% by volume alcohol will necessarily comprise no more than 40% by volume terpene. Likewise, an embodiment comprising 60% by volume terpene will necessarily comprise no more than 40% by volume alcohol.

In alternative embodiments a composition is prepared consisting of: 1) between about 5% to about 60% alcohol; 2) between about 5% to about 60% terpene containing liquid; 3) an effective amount of mixing agent for mixing the terpene containing liquid in water; 4) optionally, an abrasive;

5) optionally, an acid, base, or combinations thereof for adjusting the pH of the composition to a suitable range for mixing the composition and thereafter if needed to adjust the pH to a suitable working range; and 6) water.

In still alternative embodiments a composition is prepared consisting essentially of: 1) between about 5% to about 60% alcohol; 2) between about 5% to about 60% terpene containing liquid; 3) an effective amount of mixing agent for mixing the terpene containing liquid in water; 4) optionally, an abrasive; 5) optionally, an acid, base, or combinations thereof for adjusting the pH of the composition to a suitable range for mixing the composition and thereafter if needed to adjust the pH to a suitable working range; and 6) water.

In all of the embodiments described herein, the terpene containing liquid comprises either a substantially pure terpene liquid, a liquid mixture having two or more terpenes, or either of the preceding in a liquid mixture containing additional compounds. The amount of terpene containing liquid as a percentage of the total composition by volume is typically in the range from about 5% to about 60%, and more typically from about 5% to about 45%. Preferably, the terpene containing liquid comprises a liquid selected from the group consisting of hemiterpenes, monoterpenes, sesquiterpenes, limonene, cedar oil, pine oil, citrus oil, caraway oil, canola oil, spearmint, and combinations of the proceeding. In preferred but not essential embodiments, the terpene containing liquid comprises limonene or consist essentially of limonene. Typically the limonene utilized is d-limonene because it is the predominant naturally occurring form of limonene, however the composition can comprise l-limonene.

In preferred but not essential embodiments, the alcohol of the composition is ethanol. Ethanol is preferred because it is effective when combined with the other components of the composition, it has a very low toxicity, and it is biodegradable. A desirable amount of ethanol as a percentage of the total composition by volume is in the range from about 5% to about 60%. However, a higher or lower percentage by volume may be used. In alternative embodiments the alcohol is one other than ethanol, such as for example isopropanol.

In some embodiments, the composition further comprises an abrasive agent to facilitate the mechanical removal or the ink, paint, or coating. Some abrasive agents further function as a thickener of the composition. An example of a suitable abrasive agent is sodium methasilicate, which can be added to the composition in an amount from about 10 grams/liter to about 400 grams/liter.

The mixing agent typically comprises emulsifiers, surfactants, and combinations thereof. The mixing agent is added in an amount sufficient to allow the terpene containing liquid to go into solution with water and to improve the consistency of the composition. The mixing agent may also be present in the terpene containing liquid prior to formation of the composition of the invention, in which case little or no mixing agent might be added directly to the composition. The mixing agent can also function as a thickener or further comprise a thickener. Suitable mixing agents include but are not limited to the following: lecithin; sodium carboxmethylcellulose; Methocel™ methylcellulose; hydroxypropyl methylcellulose, magnesium aluminum sulphate; water soluble vinyl polymers having suspending, thickening, and gel-forming properties such as the product sold under the trademark CARBOPOL-ETD 2623 (B. F. Goodrich Co., Cleveland, Ohio); acid thickeners such as the product sold under the trade name CHEMAX Acid Thickener (Chemax, Beaumont Tex.), or the product sold under the trade name Ciba Thickener (Ciba Specialty Chemicals Corp., Tarrytown N.Y.), and combinations of the preceding. As an example, the mixing agent can comprise methocel androxypropyle methlcellulose in an amount from about 10 grams/liter to about 250 grams/liter. In other embodiments, the mixing agent comprise lecithin in an amount from about 30 grams/liter to about 200 grams/liter, and if a slurry is desired, lecithin in an amount from about 50 grams/liter to about 70 grams/liter.

In one particular embodiment, the composition is prepared by combining the following: 1) ethanol in an amount from about 5% to about 60% by volume; 2) limonene in an amount from about 5% to about 45% by volume; 3) a sufficient amount of mixing agent for mixing the limonene in water and improving the consistency of the composition, the mixing agent selected from the group consisting of lecithin, sodium carboxmethylcellulose, Methocel™ methylcellulose, hydroxypropyl methylcellulose, ciba thickener, magnesium aluminum sulphate, Chemax acid thickener, water soluble vinyl polymers, and combinations of the preceding; 4) an abrasive agent; 5) water; and 6) optionally, an acid, base, or combinations thereof for adjusting the pH of the composition to a suitable range for mixing the composition and thereafter if needed to adjust the pH to a suitable working range.

In some embodiments, the composition further comprises a sufficient amount of an acid, a base, or mixtures thereof for adjusting the pH of the composition. With some mixing agents it is desirable to adjust the pH to a first range that facilitates the formation of the mixture and then to adjust the pH to a second working range.

In one embodiment, the ink, paint and coating remover consist essentially of the following: 1) ethanol in an amount from amount from about 5% to about 60% by volume; 2) a terpene containing liquid selected from the group consisting of hemiterpenes, monoterpenes, sesquiterpenes, d-limonene, l-limonene, cedar oil, pine oil, citrus oil, caraway oil, and combinations of the proceeding; 3) a mixing agent is selected from the group consisting of emulsifiers, surfactants, thickeners, and combinations thereof; and 4) water. Preferably, the terpene containing liquid in the above embodiment comprises limonene in an amount from about 5% to about 45% by volume.

The invention further includes a process for removing an ink, paint, or coating from a surface. The process comprises the following steps: 1) selecting a composition prepared by combining an alcohol in an amount from about 5% to about 60% by volume, a terpene containing liquid in an amount from about 5% to about 60% by volume, a sufficient amount of mixing agent for mixing the terpene containing liquid in water, and water; 2) applying the selected composition to the surface; 3) incubating the composition on the surface for a sufficient amount of time to soften the coating; and 4) mechanically removing the softened coating from the surface. In one particular embodiment, the coating removed by the process is paint. In another embodiment, the coating removed by the process is wet or dry ink, including multiple layers of ink. In still another embodiment, the coating to be removed comprises carbon black, hard carbon, and soft carbon deposits.

The step in which the coating is softened also includes reducing the adherence of the coating to the hard surface from which it is being removed. The amount of time required for incubation varies according to the material to be removed. For example, to remove burnt carbon from a metal such as a gun the incubation is at least about 20 seconds, and is typically about 30 seconds but can more time or even less depending on the quantity of carbon. To remove dried UV ink the object is typically incubated at least about 20 minutes, and typically about 30 minutes to remove 4 to 5 layers of the ink. To remove MilSpec paint (military specification) the incubation time is typically 2 to 4 hours, or can be longer. For epoxy the incubation time is typically between 10 to 30 minutes, depending on the particular formula.

The mechanical scraping step of the process for removing a paint or coating from a surface includes any mechanical action presently known or developed in the future that is effective, in itself or in combination with other processes, at removing the softened coating from the surface. Examples of suitable methods to perform the mechanical removal step include but are not limited to brushing, pressure spraying, grinding, scraping, washing, wiping, and combinations thereof. As examples; wet ink is typically removed by wiping with a rag and hardened paint can be removed by scraping, pealing, or a pressure spray.

In operation, an embodiment of the composition best suited for the particular use is selected with reference to the examples provided below. The composition is applied the surface of the object in which the ink, paint, or coating is to be removed, or the object can be immersed in the composition. The object is incubated until the coating is softened. The combination of the alcohol, terpene, and water provides an unexpected synergistic property to the composition which allows the composition to more effectively penetrate the paint or coating and to take effect at the boundary layer between the paint or coating and the hard surface. In many cases this allows large chunks or pieces of the paint or coating to be peeled from the hard surface after incubation with the composition and softening of the coating. An advantage of the composition of the invention is that many embodiments do not leave a residue after coating is removed as do existing cleaning solutions or solvents containing terpenes. A further advantage of embodiments of the invention is that paint, ink, and coatings, can be removed from plastic surfaces without damaging the plastic surface.

EXAMPLES

The following examples illustrate various formulations useful for different applications in accordance with the present invention.

Example 1

A composition suitable for removing hardened paint is prepared by combining the following:

| | |
|---|---|
| ethanol | 60 ml |
| limonene | 15 ml |
| lecithin | 5 grams |
| Stock Solution* | Balance to 100 ml total |

*The stock solution consists of 1 liter H2O, 5 ml HCl (29%), and 25 grams Na2SiO3.

Example 2

A composition suitable for removing hardened paint is prepared by combining the following:

| | |
|---|---|
| ethanol | 60 ml |
| limonene | 15 ml |
| hydroxypropyl methylcellulose | 2.5% |
| NaOH | 0.2 grams |
| Stock Solution* | Balance to 100 ml total |

*The stock solution consists of 1 liter H2O, 5 ml HCl (29%), and 25 grams Na2SiO3.

Example 3

A composition suitable for removing hardened military specification paint is prepared by combining the following:

| | |
|---|---|
| ethanol | 60 ml |
| d-limonene | 25 ml |
| hydroxypropyl methylcellulose | 2.5 grams |
| acid | 5 ml (of 29% stock solution) |
| base | 0.1 grams |
| Stock Solution* | Balance to 100 ml total |

*The stock solution consists of 1 liter H2O, 5 ml HCl (29%), and 25 grams Na2SiO3.

Example 4

A paint and coating remover having the following composition, in percent by volume, is prepared:

| | |
|---|---|
| ethanol | 45 ml |
| limonene | 20 ml |
| hydroxypropyl methylcellulose | 2.5% |
| sodium methasilicate | 10 grams |
| NaOH | 0.2 grams |
| Stock Solution* | Balance to 100 ml total |

Example 5

A composition suitable for removing ink from silk screens and removing ink from a printing press is prepared by combining the following:

| | |
|---|---|
| ethanol | 5 ml |
| limonene | 5 ml |
| lecithin | 2.5 grams |
| acid | 1.5 ml (29% stock) |
| Stock Solution* | Balance to 100 ml total |

*The stock solution consists of 1 liter H2O, 5 ml HCl (29%), and 25 grams Na2SiO3.

Example 6

A composition suitable for removing ink from silk screens and removing ink from a printing press is prepared by combining the following:

| | |
|---|---|
| ethanol | 5 ml |
| limonene | 5 ml |
| hydroxypropyl methylcellulose | 2.5 grams |
| NaOH | 1.5% grams |
| Stock Solution* | Balance to 100 ml total |

*The stock solution consists of 1 liter H2O, 5 ml HCl (29%), and 25 grams Na2SiO3.

Example 7

A method of removing ink from silk screens and removing ink from a printing press A composition is prepared by combining, for every 100 ml of total, the following: 50 ml ethanol, 50 ml limonene, 25 ml methocel androxypropyle methlcellulose solution from Dow Chemical Company, Midland Mo., 15 ml NaOH, and stock solution to a total of 1 liter. The stock solution consists of 1 liter H2O, 5 ml HCl (29%), and 25 grams Na2SiO3. The composition is applied on a silk screen and is allowed to sit at room temperature for about 20 to 30 minutes. The ink is then removed with a high pressure spray.

The examples in the table below illustrate various formulations useful for different applications in accordance with the present invention.

| Component | Amount/100 ml | | | | | | |
|---|---|---|---|---|---|---|---|
| Example # | 8 | 9 | 10 | 11 | 12 | 13 | 14 |
| ethanol (in %/total volume) | 05 | 30 | 60 | 45 | 10 | 20 | 15 |
| limonene (in %/total volume) | 05 | 20 | 15 | 25 | 10 | 5 | 10 |
| sodium methasilicate (in grams/100 ml) | 20 | 10 | 20 | 30 | 10 | 5 | 10 |
| mixing agent (in grams/100 ml)* | 5 | 5 | 5 | 2 | 2 | 2 | 2 |
| acid (in ml of 29% stock solution) | 1 | 5 | 5 | 1.5 | 5 | 0 | 3 |
| base (in grams/100 ml) | 0.2 | 0 | 0.2 | 0.1 | 0.1 | 0 | 0.1 |
| H₂O (amount needed to bring total to 100 ml) | Balance | Balance | Balance | Balance | Balance | Balance | Balance |

*Mixing agent is either lecithin or methocel androxypropyle methlcellulose

Having thus described the invention, it should be apparent that numerous structural modifications and adaptations may be resorted to without departing from the scope and fair meaning of the instant invention as set forth hereinabove and as described hereinbelow by the claims.

Although the present invention has been described in considerable detail with reference to certain preferred versions thereof, other versions are possible. Therefore, the spirit and scope of the appended claims should not be limited to the description of the preferred versions described herein.

All features disclosed in the specification, including the claims, abstracts, and examples, and all the steps in any method or process disclosed, may be combined in any combination, except combinations where at least some of such features and/or steps are mutually exclusive. Each feature disclosed in the specification, including the claims, abstract, and examples, can be replaced by alternative features serving the same, equivalent or similar purpose, unless expressly stated otherwise. Thus, unless expressly stated otherwise, each feature disclosed is one example only of a generic series of equivalent or similar features.

Any element in a claim that does not explicitly state "means" for performing a specified function or "step" for performing a specified function, should not be interpreted as a "means" or "step" clause as specified in 35 U.S.C. § 112.

What is claimed is:

1. A composition suitable for use as a paint and coating remover, the composition being prepared by combining:
    (a) an alcohol in an amount from about 5% to about 60% by volume;
    (b) a terpene containing liquid in an amount from about 5% to about 60% by volume;
    (c) a sufficient amount of mixing agent for mixing the terpene containing liquid in water, wherein the mixing agent is selected from the group consisting of lecithin, sodium carboxymethylcellulose, methylcellulose, hydroxypropyl methylcellulose, ciba thickener, magnesium aluminum sulphate, acid thickeners, water soluble vinyl polymers, and combinations of the preceding;
    (d) an abrasive; and
    (e) water.

2. The composition of claim 1 wherein the alcohol is ethanol in an amount from about 5% to about 20% by volume.

3. The composition of claim 1 wherein the terpene containing liquid comprises a liquid selected from the group consisting of hemiterpenes, monoterpenes, sesquiterpenes, d-limonene, l-limonene, cedar oil, pine oil, citrus oil, canola oil, caraway oil, spearmint, and combinations of the proceeding.

4. The composition of claim 1 wherein the terpene containing liquid comprises limonene in an amount from about 5% to about 45% by volume.

5. The composition of claim 4 wherein limonene is d-limonene.

6. The composition of claim 1 further comprising an acid, base, or combinations thereof for adjusting the pH of the composition.

7. The composition of claim 1 wherein the mixing agent also functions as a thickener or further comprises a thickener.

8. The composition of claim 1 wherein the mixing agent is selected from the group consisting of methylcellulose and hydroxypropyl methylcellulose in an amount from about 10 grams/liter to about 250 grams/liter and lecithin in an amount from about 30 grams/liter to about 200 grams/liter.

9. The composition of claim 1 wherein the coating to be removed by the composition is ink, and wherein the alcohol is ethanol in an amount from about 5% to about 10% by volume and the terpene is limonene containing liquid in an amount from about 5% to about 10% by volume.

10. The composition of claim 1 wherein the coating to be removed by the composition is hardened paint, and wherein the alcohol is ethanol in an amount from about 40% to about 60% by volume and the terpene consisting essentially of is limonene containing liquid in an amount from about 10% to about 20% by volume.

11. A composition suitable for use as a paint and coating remover, the composition being prepared by combining:
   (a) ethanol in an amount from about 5% to about 60% by volume;
   (b) limonene in an amount from about 5% to about 45% by volume;
   (c) a sufficient amount of mixing agent for mixing the limonene in water, wherein the mixing agent is selected from the group consisting of lecithin, sodium carboxymethylcellulose, methylcellulose, hydroxypropyl methylcellulose, ciba thickener, magnesium aluminum sulphate, acid thickeners, water soluble vinyl polymers, and combinations of the preceding;
   (d) an abrasive agent;
   (e) water; and
   (f) optionally, an acid, base, or combinations thereof for adjusting the pH of the composition.

12. The composition of claim 11 wherein the mixing agent further functions as a thickener.

13. A paint and coating remover consisting essentially of:
   (a) an alcohol in an amount from about 5% to about 60% by volume;
   (b) a terpene containing liquid in an amount from about 5% to about 60% by volume;
   (c) a sufficient amount of mixing agent for mixing the terpene containing liquid in water and improving the consistency of the composition, wherein the mixing agent is selected from the group consisting of lecithin, sodium carboxymethylcellulose, methylcelluose, hydroxypropyl methylcellulose, ciba thickener, magnesium aluminum sulphate, acid thickeners, water soluble vinyl polymers, and combinations of the preceding;
   (d) an abrasive;
   (e) optionally, an acid, base, or combinations thereof for adjusting the pH of the composition; and
   (f) water.

14. The paint and coating remover of claim 13, wherein:
   (a) the alcohol is ethanol in an amount from amount from about 5% to about 60% by volume; and
   (b) the terpene containing liquid comprises a liquid selected from the group consisting of hemiterpenes, monoterpenes, sesquiterpenes, d-limonene, l-limonene, cedar oil, pine oil, citrus oil, canola oil, caraway oil, spearmint, and combinations of the proceeding.

15. The paint and coating remover of claim 13 wherein the terpene containing liquid comprises limonene in an amount from about 5% to about 45% by volume.

16. A composition suitable for use as an ink remover, the composition being prepared by combining:
   (a) ethanol in an amount from about 5% to about 20% by volume;
   (b) limonene in an amount from about 5% to about 20% by volume;
   (c) a sufficient amount of mixing agent for mixing the limonene in water, wherein the mixing agent is selected from the group consisting of lecithin, sodium carboxymethylcellulose, methylcelluose, hydroxypropyl methylcellulose, ciba thickener, magnesium aluminum sulphate, acid thickeners, water soluble vinyl polymers, and combinations of the preceding;
   (d) an abrasive agent;
   (e) water; and
   (f) optionally, an acid, base, or combinations thereof for adjusting the pH of the composition.

17. A process for removing a coating comprising burnt carbon deposited on metal or plastic comprising the steps of:
   (a) selecting a composition prepared by combining:
      (i) an alcohol in an amount from about 5% to about 60% by volume;
      (ii) a terpene containing liquid in an amount from about 5% to about 60% by volume, the terpene in the composition consisting essentially of terpenes not containing conjugated carbon-carbon double bonds selected from the group consisting of hemiterpenes, monoterpenes, and sesquiterpenes,
      (iii) a sufficient amount of mixing agent for mixing the terpene containing liquid in water; and
      (iv) water;
   (b) applying the selected composition to the surface;
   (c) incubating the composition on the surface for a sufficient amount of time to soften the coating; and
   (d) mechanically removing the softened coating from the surface.

18. The process of claim 17 wherein the incubation step is at least about 20 seconds.

19. The process of removing a coating comprising UV dried ink from a surface, the process comprising the steps of:
   (a) selecting a composition prepared by combining:
      (i) an alcohol in an amount from about 5% to about 60% by volume;
      (ii) a terpene containing liquid in an amount from about 5% to about 60% by volume,
      (iii) a sufficient amount of mixing agent for mixing the terpene containing liquid in water; and
      (iv) water;
   (b) applying the selected composition to the surface;
   (c) incubating the composition on the surface for a sufficient amount of time to soften the coating; and
   (d) mechanically removing the softened coating from the surface.

20. The process of claim 19 wherein the incubation step is at least about 20 minutes.

21. The process of claim 19 where the coating to be removed comprises multiple layers of ink.

22. The process of claim 17 wherein the terpene is limonene.

* * * * *